United States Patent [19]

Henninghaus

[11] 4,000,751
[45] Jan. 4, 1977

[54] HYDRAULIC POWER SYSTEM WITH AUTOMATIC PRIORITY-DEMAND FLOW CONTROL MEANS

[75] Inventor: Franz Henninghaus, Dormagen, Germany

[73] Assignee: International Harvester Company, Chicago, Ill.

[22] Filed: Dec. 12, 1975

[21] Appl. No.: 640,140

[30] Foreign Application Priority Data

Dec. 12, 1974 Germany .......................... 2458897

[52] U.S. Cl. ................................. 137/101; 60/422
[51] Int. Cl.² ....................................... G05D 11/02
[58] Field of Search ....................... 60/422; 137/101

[56] References Cited

UNITED STATES PATENTS

| | | | |
|---|---|---|---|
| 2,850,879 | 9/1958 | Schnabel | 60/422 X |
| 2,995,141 | 8/1961 | Hipp | 137/101 |

*Primary Examiner*—Robert G. Nilson
*Attorney, Agent, or Firm*—Raymond E. Parks; Floyd B. Harman

[57] ABSTRACT

A hydraulic power system having a plurality of independent hydraulic power circuits of varied orders of precedence connected in parallel to a single fluid source. Thee is at least one power circuit which is provided with a priority-demand valve means which appropriates a larger volume of fluid for its power circuit when there is a demand for fluid and diverts the remainder of the fluid to the other power circuits which are either equal to or lower in order of precedence.

7 Claims, 2 Drawing Figures

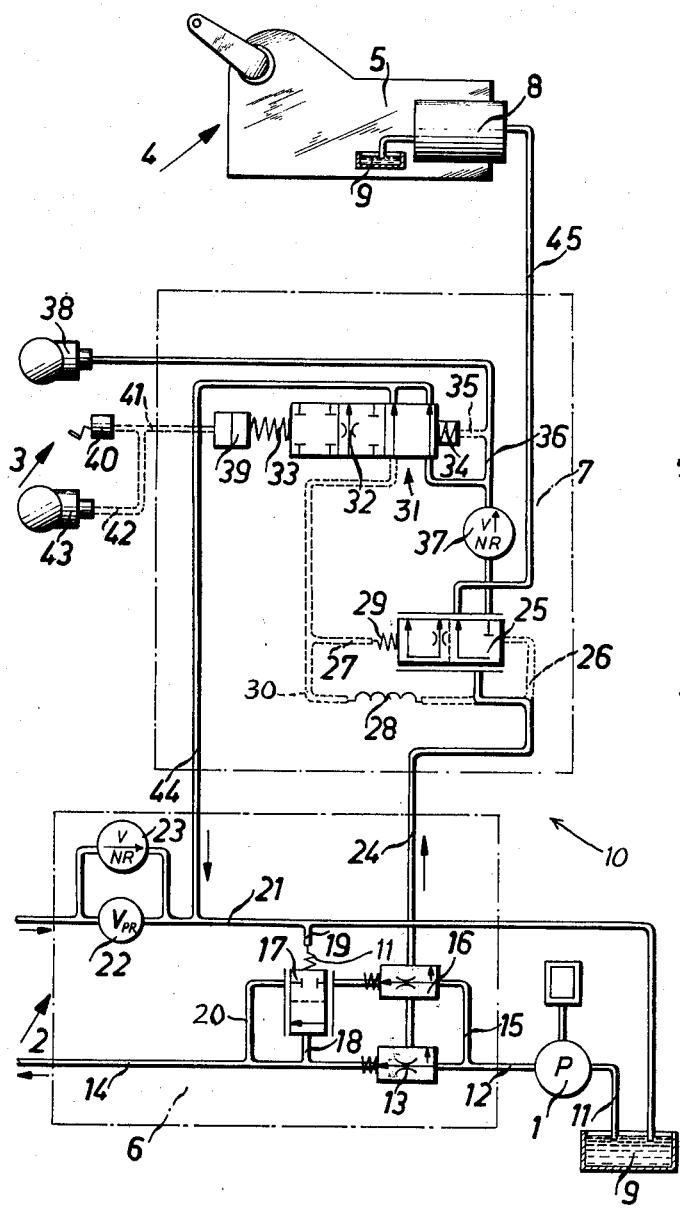
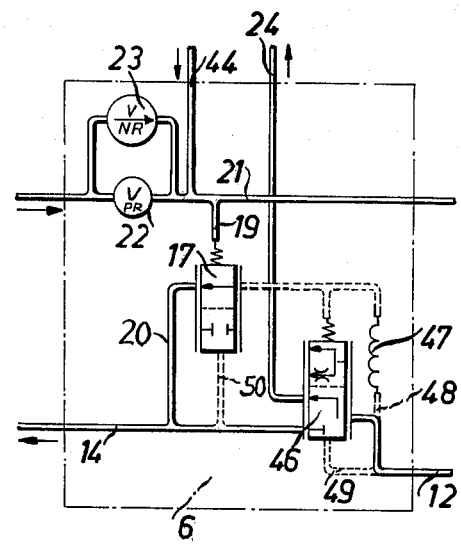
FIG.1
FIG.2

HYDRAULIC POWER SYSTEM WITH AUTOMATIC PRIORITY-DEMAND FLOW CONTROL MEANS

CROSS-REFERENCE TO A RELATED APPLICATION

U.S. patent application Ser. No. 598,607— Christian Pfeil and Hans Breidenbach— filed on July 24, 1975 (Corresponds to German Application No. P-2435602.3 filed on 24 July, 1974 in the name of International Harvester Company m.b.H.).

BACKGROUND OF THE INVENTION

This invention relates to an automatic fluid flow control which is used to distribute hydraulic fluid from a hydraulic fluid source into several parallel fluid power circuits comprising a hydraulic system. The power circuits of the system have varied orders of precedence and the automatic flow control between the circuits is effected by means of a priority-demand flow control valve means in at least one of the circuits which maintains a constant proportioned flow of hydraulic fluid to the circuit of highest precedence while distributing another proportioned amount to one of the other circuits which may be of equal or lower precedence and one which is demanding the fluid.

DESCRIPTION OF THE PRIOR ART

One such automatic flow control device or means for the distribution of hydraulic fluid is known through the German Pat. No. 1,211,881 (corresponds to U.S. Pat. No. 3,033,221—Strader—May 8, 1962) where the hydraulic power system comprises a hydraulic steering circuit and a hydraulic power lift circuit for raising and lowering the implements hitched to a farm tractor. In the known control system with the flow control valve means, the pressure in the steering circuit must be higher than that in the implement circuit, or the effective or reactive faces on the shiftable servo-valve spool on the steering side of the circuit must be in a specifically sized relation to the effective or reactive faces on the servo-valve spool on the implement side of the circuit. This arrangement does not only result in a control device adapted for specific pressure ratios, but it also requires considerable costs with regards to the manufacture of the servo-spool.

As regards to farm tractors in particular as motor vehicles, we know of designs where both the tractor and a hitched implement, such as a trailer, are both braked by means of hydraulics simultaneously with the steering of the tow tractor or vehicle by the same hydraulics. In another known design a farm tractor is also equipped with a hydraulically actuated power lift. Until now independent or separate hydraulic circuits were used for each of these operations and thus the individual hydraulic operatios could be performed independent of the other operations at any time when required. However, special attention must be given to the sequence in which the individual circuits in the system are pressure loaded because of the different traffic regulations which are in force in various countries. There are some countries, where the hydraulically actuated brakes must be given priority over the hydraulic steering; whereas in some other countries the hydraulic steering circuit must be given priority over present day hydraulic towing vehicle brakes. To be able to equip vehicles in the same manner for both kinds of requirements, this invention is based on the objective of providing a fluid flow control device or means in such a manner that both the hydraulically actuated steering and braking operations are possible without any danger of the two power circuits affecting one another.

SUMMARY OF THE INVENTION

This invention is based on the objective of providing an automatic fluid flow control device or means of the aforementioned type for a plurality of hydraulic power circuits, whereby only one hyraulic fluid source is used at a minimum expenditure of energy and that the supply of fluid to the individual power circuits of the system is assured even when one circuit is demanding more fluid over the other circuits. The problem is solved by connecting the plurality of hydraulic power circuits in parallel to a flow control means. The flow control valve means includes spring loaded pressure shiftable flow on-off valve means which is controllable as a function of the differential pressure between the input and return lines of the hydraulic power circuit which has procedence over all of the other circuits. The flow on-off valve means allows an additional volume of fluid to flow into this primary hydraulic circuit upon demand, yet provides for the surplus to flow into the other power circuits. In accordance with the teachings of this invention, an automatic fluid flow control device is provided which is operational independently of the pressure in the secondary power circuits of the system; one which supplies sufficient hydraulic fluid to the primary hydraulic circuit of the system by the automatic reversing of the flow on-off or switch means after this switch valve means has been shifted against a spring means in reaction to the differential pressure between the input and output lines of the primary hydraulic power circuit of the system.

There are several ways of achieving this type of control. Expediently the flow switch valve means is arranged in a service line branching off of a pressure line emanating out of the hydraulic fluid flow source. The flow switch valve means is in parallel relation with a first flow control valve means which is in the pressure line and is arranged in series downstream of a second flow control valve which is installed in the service line. The second flow control valve has a first position where a portion of the available fluid is directed to the secondary hydraulic power circuit in the event the primary hydraulic circuit has not been actuated, and a second position where this portion of available fluid is redirected back to the primary circuit though the switch valve means in the event that the primary hydraulic circuit has been actuated. When the pressure in the input or pressure line is sufficient to overcome the combined forces of the spring and pressure in the return line, the switch valve moves from a fluid shut-off position to an open or fluid flow position for the service line downstream of the switch valve, so that in addition to the constant small volume flow of hydraulic fluid via the first flow control valve, there is now a flow of hydraulic fluid back into the primary hydraulic system via the switch valve and the service line which connects back to the pressure line. Thus a perfect actuation of the primary hydraulic circuit is assured by an ample supply of hydraulic fluid.

In a modification of this system, the switch valve means can be installed parallel to a modified unitary flow control valve means which incorporates both flow control valves. The service or control line, which branches off of the pressure line emanating out of the hydraulic fluid source, is provided with a throttle upstream of the switch valve means. If primary hydraulic circuit of the system is not actuated, the switch valve maintains an open free-flow position to the primary circuit and of the primary hydraulic circuit of the system is actuated, the switch valve means takes up a fluid shut-off position to the primary circuit. In this case the switch valve means is designed to function as a check valve, since it takes up its fluid shut-off position after sufficient loading by the reaction pressure in the inlet line of the primary hydraulic circuit. Then an additional volume of hydraulic fluid can pass into the primary hydraulic circuit via the modified flow control valve means which is pilot-controlled by the increase of the pressure head in the service or control line.

To assure that there is a reaction pressure in every instances which reaches a value that is sufficient to shift the spring biased switch valve, it is recommended to install a pressure regulating valve in the return line and a non-return or or one-way valve in a branch by-passing the regulating valve upstream of the connection of the return line to the spring loaded side of the switch valve means. This way the reaction pressure, even with small forces of reaction coming from the primary hydraulic circuit, can always be maintained at a minimum which, however, is sufficiently strong to effect the shifting of the switch valve means. In principle, the non-return or one-way valve has been provided to assure that in cases of failure of the hydraulic fluid source there is an ample reaspiration in the primary hydraulic circuit with the objective of maintaining, in such a case, for a transient period, at least the function of the primary hydraulic circuit. As regards this specific invention, it is of special importance that the discharge side of the flow control valve or valves is or are respectively connected to a controllable second hydraulic circuit of equal order which simultaneously is connected, by means of a connecting line, to a controllable third hydraulic circuit which is of a secondary order. Furthermore, the hydraulic circuit of equal order is connected, by means of a return line, to the return line of the primary hydraulic circuit. The primary hydraulic circuit includes the hydraulic steering system, whereas the hydraulic circuit of equal order includes the hydraulic tractor and trailer braking systems and the hydraulic circuit of secondary order includes the farm tractor hydraulic power lift system. The fluid flow control means taught by the invention makes it feasible for the first time to supply fluid from a single hydraulic fluid source with a sufficient volume not only for use in the primary hydraulic circuit but for use also in the circuit of equal order as well as use in the secondary circuit. The invention also assures that, independent of the pressures prevailing in the hydraulic circuits of primary, equal, and secondary orders of precedence, the primary hydraulic circuit and the circuit of equal order are supplied with a sufficient volume of hydraulic fluid in every case for suitable operation. This can be achieved without difficulty, because the primary hydraulic circuit (that is the steering system) requires for a short period of time a sufficient volume of hydraulic fluid, whereas the second hydraulic circuit of equal order of precedence (the tractor and trailer brake system) requires for a short period of time sufficient hydraulic pressure, which must be arranged such that the trailer brake becomes effective before the brake system of the tractor.

BRIEF DESCRIPTION OF THE DRAWING

In order that the invention may be readily understood and put into practical effect, reference will now be made to the various figures of the drawing in which:

FIG. 1 is a diagrammatic representation of a hydraulic power system incorporating an automatic flow control means in accordance with the invention; and FIG. 2 is a diagrammatic representation of a second embodiment of an automatic flow control means.

DESCRIPTION OF THE PREFERRED EMBODIMENT

An automatic flow control means or device 10 is pictured in FIG. 1 which distributes hydraulic fluid pumped from a hydraulic fluid source or pump 1 between a primary or first hydraulic circuit 2, which comprises for example a hydraulic steering system, a second hydraulic circuit 3 of equal order of precedence, which comprises for example a hydraulic tractor and trailer brake system, and a secondary or third hydraulic circuit 4 of lesser order of precedence than the first and second circuits. The third circuit for example comprises a hydraulic power lift system for use in a farm tractor (not shown). The flow control means or device 10 includes a first priority-demand flow control valve means 6, a second priority-demand flow control valve means 7, and a flow divider valve means 8 (not shown diagrammatically).

By way of a suction or intake line 11, the hydraulic fluid source or pump 1 takes or draws in hydraulic fluid from a reservoir 9. By way of a pressure or fluid output line 12 the hydraulic fluid is pumped out from the pump 1 into the first priority-demand control valve means 6 which has a first flow control valve means 13 through which a constant small volume of fluid flows into a feed line 14 which is connected to the hydraulic steering system 2. There is a second flow control valve 16 provided in a branch pressure line 15 which is connected to the pressure or output line 12 upstream of the first flow control valve means 13. A spring loaded pressure responsive valve means 17 is arranged at the outlet or downstream side of the second control valve means 16. It is shiftable into two operating positions, a fluid shut-off position and a fluid-flow position. The pressure responsive sides of the switch valve means 17 have the effective control faces connected to the input and discharge lines 14, 21 of the steering system 2. One effective control face is connected by a line 18 to the feed line 14. The spring biased effective control face is connected by a line 19 to the return or discharge line 21. The arrangement is such that the switch valve means 17 assumes the fluid shut-off position shown in FIG. 1 when the steering system 2 is not activated. A discharge branch line 20 connects the outlet port of the switch valve means 17 to the feed line 14 when the valve means is shifted to the open or fluid-flow position. Thus by means of the first flow control valve means 13 there is a constant supply of a small volume of fluid to the primary circuit 2 for steering the vehicle. If, however, the primary hydraulic system 2 is actuated, a reaction pressure builds up in the feed line 14. By way of the high pressure line 18, this reaction pressure acts upon the control face of the switch valve means 17 and subsequently moves or shifts the valve means 17 against the force of the spring 11 and the pressure in low pressure line 19 to the open or fluid-flow position. By way of the branch line 15, through the second flow control valve means 16 and via the open ports in the switch valve means 17, a second volume of fluid can now flow into the feed line 14 through the branch line 20 and thus to the steering circuit 2, so that in this case an additional as well as larger volume of fluid is put at the disposal of the steering device 2. To always maintain in the feed line 14 a pressure sufficiently high and adequate to shift the switch valve 17, a pressure regulator valve 22 and a by-pass check valve 23 are arranged in parallel in the return line 21.

By means of a connecting pressure line 24 a second discharge port in the first and second flow control valve 13 and 16 are each connected to the second priority-demand flow control valve means 7. The second priority-demand flow control valve means 7 has a spring loaded pilot-controlled flow control valve means 25, the effective control ends of which are connected to the pilot flow and control lines 26 and 27. Pilot line 25 is directly connected to the connecting pressure line 24 while pilot line 27 connects to the pressure line 24 through a throttle 28. Pilot line 27 is connected to the spring loaded side of the pilot valve means 25. The spring 29 is arranged downstream of the throttle 28. The second priority-demand flow control valve 7 further includes a multi-way valve 31 which has an axially moveable servo-valve spool 32. The effective control ends at both sides of the spool 32 are loaded by springs 33 and 34. As shown in FIG. 1, the servo-valve spool 32 can be moved to a floating non-brake position, a central or partial brake position, and a locked or full brake position. A pilot control line 35 connects the control face of the servo-valve spool 32, which holds spring 34, to a first brake pressure line 36. The first brake pressure line 36 originates at one of two discharge ports in the pilot-controlled flow control valve 25. A non-return valve 37 is arranged in the first brake line 36 downstream of the one discharge port. The brake line 36 runs to a first brake cylinder 38. The other or second control face of the servo-valve spool 32, housing the second spring 33, is connected to a hydraulic servo-unit 39 which is activated by means of a pedal 40 connected to a transmission line 41. A main brake line 42 is also connected to the transmission line 41 and runs to a main brake cylinder 43 which may, for example, be carried on a farm tractor (not shown). In the floating position of the spool 32 there are two discharge ports which are connected to a return line 44 which communicates with the return line 21 of the demand flow control valve means 6. One of the discharge ports is connected to the first brake line 36 downstream of the one-way flow valve 37, and the second port is connected to the pilot line 27 downstream of the throttle 28. Originating at the second discharge port of the pilot-controlled flow control valve 25, there is a third pressure line 45 which runs to the flow divider or control valve 8 of the third or secondary circuit 4. In the non-operative condition of the valve 8, the fluid passes through the valve and discharges into the reservoir 9. The operation of the priority-demand flow means according to the invention, will now be explained.

If none of the three hydraulic circuits 2, 3, and 4 is actuated, the system is in the condition shown in FIG. 1. As an example, 30 liters of a hydraulic fluid, which has just been pumped into the system by a motor driven hydraulic pump 1 is apportioned at the first flow control valve means 13 in such a way that approximately 1 liter flows into the feed line 14 for use in the primary circuit 2, and approximately 29 liters flows through the discharge port of the flow control valve means 13 and into the connecting pressure line 24 for use in the second flow control valve means 7. Since the branch pressure line 15 is blocked by the switch valve means 17, there is no flow through the second flow control valve means 16 and it discharges into the connecting pressure line 24. Since, as mentioned above, neither the second circuit 3 or the third circuit 5 is in an operating position, the hydraulic fluid arriving at the second control valve means 7 passes back into the reservoir 9 by two separate flow paths. One path flows through the pilot-controlled flow control valve means 25 into the third pressure line 45 and the neutrally positioned control valve 8 which dumps the flow into the tank 9. The second path passes through the throttle 28 into the control line 27, which connects with one of two inlet ports in the multi-way valve 31 and passes through the valve into one of two output port which are connected to the return line 44. Thus the second path can cross unrestrictedly through the multi-way valve 31 into the return line 44, from where it flows into the return line 21 of the first flow divider valve means 6 and reaches the reservoir 9. If, during this condition, the power lift 5 is actuated by moving the control valve 8 to an operating position, there will be a sufficient volume of hydraulic fluid available in the secondary circuit 4 to lift or lower the power lift 5 without affecting the other two circuits.

Let us next assume that a tractor or two vehicle and a trailer hitched thereto are to be bracked. Then, first of all, the pedal 40 is partially depressed, partially pressurizing the hydrostatic link 41 and activating hydraulic servo-unit 39 to a point which partially loads the spring 33. The partially loaded spring 33 then moves the servo-valve 32 from the floating or brake-off position to the center for partial brake-on position. When the servo-valve spool 32 shifts to the center or partial brake-on position, the branch from the second pressure line 36 is blocked from communicating with the return line 44, and the fluid in the throttle line 27 now passes through a second throttle which is in valve 31 and into the return line 44. A reaction pressure builds up in the throttle line 27 and acts upon the spring loaded end of the pilot valve 25 axially moving the pilot-controlled flow control valve means 25 to the right from the position shown in FIG. 1 to an operating position where both output ports are opened. The flow at the input port from the connecting pressure line 24 is now divided between the two output ports. Flow continues unrestricted to the third pressure line 45 serving the control valve 8, and simultaneously, a restricted flow is now directed to the trailer brake line 36 and to the trailer brake cylinder 38, thus causing the trailer to be braked. Depressing the pedal 40 further the tractor brake line is now pressurized through the servo line 41 thereby actuating the main brake cylinder 43 of the tractor or tow vehicle so that the tractor or tow vehicle is braked with a slight delay. Approximately 15 liters of the total volume of pumped fluid is required for a short term pressure build up in the brake system to provide the partial braking of the trailer and tractor or tow vehicle. For a complete braking, the pedal 40 is fully depressed so that the brake line 41 is fully pressurized and the spring 33 fully loaded. In which condition the multi-position valve is shifted to the third position thereby blocking both input and output ports from communicating with the return line 44. The pressure continues to build-up in throttle line 27 preventing the pilot valve 25 from shifting to the left. An additional volume of fluid now passes into the trailer brake line 36 which was previously by-passed by the throttle in the valve 32 to the return line 44, thereby fully engaging the trailer brake. The full pressurization of the brake line 41 also fully engages the tractor brake 43.

In the event that simultaneous steering together with braking of the vehicle is required, the reaction pressure building up in the feed line 14 of the flow divider valve 6 will cause the switch valve 17 to shift from its fluid shut-off position to its fluid-flow position. By means of the branch line 15 and the second flow control valve 16 an additional volume of approximately eight liters of hydraulic fluid can thus flow through the switch 17 into the feed line 14 and subsequently into the steering circuit 2. This way the steering circuit is supplied with a sufficient volume of hydraulic fluid to assure satisfactory steering and simultaneously the brake circuit 3 is provided with sufficient hydraulic fluid to effect satisfactory braking. In addition, the secondary circuit 4 is also simultaneously supplied with a certain volume of hydraulic fluid. Therefore, hydraulic power system, according to the invention, has been described wherein one hydraulic pump 1 satisfactorily supplies hydraulic fluid to three hydraulic circuits 2, 3, and 4, of the system whereby two of the hydraulic circuits 2 and 3 are of equal order of precedence and the third hydraulic circuit 4 is of secondary order of precedence.

DESCRIPTION OF AN ALTERNATE EMBODIMENT

In general, the system of the alternate embodiment shown in FIG. 2 corresponds to the system shown in FIG. 1 and therefore, identical reference numbers are used to identify similar parts, valves, components, etc. The alternate embodiment differs in the arrangement of the switch valve 17, and in the substitution of the two flow control valves 13 and 16 for a single pilot-controlled flow control valve means 46, and in the inclusion of a throttle 47 in a control or throttle line 48 which replaces line 15 branching off of the pressure line 12, and in the inclusion of second control line 49 communicating with the hydraulic pump 1. The first control or throttle line 48 is connected to the input port of the switch valve 17 of a spring loaded pilot-controlled flow control valve 46. The second control line 49 is connected to the presssure line 12 and to the opposite end or the second control face of the pilot-controlled flow control valve 46. A third throttle line 50 is substituted for line 18.

If the primary hydraulic circuit 2 has not been actuated, a small volume of hydraulic fluid flows from the pressure line 12 via the control line 48, the throttle 47, and in this case to the switch valve 17 which is in the open or fluid-flow position and into the feed line 14 of the hydraulic steering circuit 2. If a sufficiently high reaction pressure builds up in the feed line 14 (which is the case when the hydraulic steering is actuated), by way of the control line 18 this reaction pressure acts upon the switch valve 17 and moves it to the closed or fluid shut-off position. In that position the flow in the control line 48 is interrupted which permits the build-up of a back pressure which acts upon the second control face of the pilot-controlled flow control valve means 46 and moves it to the other operating position. Now the hydraulic fluid delivered by the pressure line 12 is no longer solely fed into the connecting line 24, but is split up to be partially fed into the feed line 14 of the hydraulic steering circuit 2 and partially fed into the connecting line 24. Similar to the embodiment according to FIG. 1 the component flow lines 45, 27 in the connecting line 24 are divided between the hydraulic circuit 3 of equal order of precedence and the secondary hydraulic circuit 4.

The embodiments of the invention which an exclusive property of privilege is claimed are defined as follows:

1. A hydraulic power system with automatic priority-demand flow control means, comprising:
   first, second, and third hydraulic power circuits wherein at least the first circuit has priority over the other two circuits;
   a single fluid source means for supplying hydraulic fluid to the three circuits; and
   a flow control valve means in the first circuit for receiving the flow of hydraulic fluid from the source means and apportioning it between the three circuits, the control valve means including a priority-demand flow control valve means for diverting a portion of the apportioned flow to the second and the third circuits and combining the portion with the apportioned flow to the first circuit upon demand of additional hydraulic fluid by the first circuit;
   a second flow control valve means in the second circuit for receiving the apportioned flow for the second and third circuits and re-apportioning it between the aforementioned two circuits, and including a second priority-demand flow control valve means for diverting a portion of the re-apportioned flow to the third circuit and combining the portion with the re-apportioned flow to the second circuit upon demand of additional hydraulic fluid by the second circuit.

2. A hydraulic power system according to claim 1, wherein the second priority-demand flow control valve means comprise:
   a two-position flow diverter valve means having an input port connected to an inlet line receiving the apportioned flow from the first mentioned priority-demand flow control valve means and having two output ports, one output port is connected to the third circuit in both positions of the two-position valve means, and the other output port is restrictively connected to the second circuit in the second position of the two-position valve means, the two-position flow valve means further having a first pressure actuated end connected to a first control line connected to the inlet line and having a second pressure and spring actuated end connected to a second control line having a throttle therein and connected to the inlet line upstream of the throttle.

3. A hydraulic power system according to claim 2, wherein the second priority-demand flow control valve means further includes a three-position flow diverter valve means having two input ports and two output ports, one of the input ports is connected to the first control line downstream of the throttle and the other input port is connected to the second circuit and both output ports are connected to a return line of the first circuit in one position of the three-position valve means and in a second position the first control line is restrictively connected through one ouput port to the return line while the input port connected to the second circuit is blocked from the second output port and in the third position both input ports are blockd from both output ports, and the three-position valve means includes a first pressure and spring actuated end connected to a third control line connected to the second circuit and a second spring actuated end, the second spring actuated end is loaded by a hydraulic servo-unit means for shifting the valve between the three positions.

4. A hydraulic power system with automatic priority-demand flow control means, comprising:
first, second, and third hydraulic power circuits wherein at least the first circuit has priority over the other two circuits;
a single fluid means for supplying hydraulic fluid to the three circuits; and
a flow control valve means in the first circuit for receiving the flow of hydraulic fluid from the source means and apportioning it between the three circuits, the control valve means including a priority-demand flow control valve means for diverting a portion of the apportioned flow to the second and the third circuits and combining the portion with the apportioned flow to the first circuit upon demand of additional hydraulic fluid by the first circuit, the flow control valve means comprising first and second flow diverter valves arranged to receive input flow from the source means in parallel, each diverter valve having a restricted output flow line and an unrestricted output flow line, the restricted output flow line of one of the two diverter valves is connected to an input line for the first circuit and the restricted output flow line of the other diverter valve is connected to an input port of the priority-demand valve means, the unrestricted output flow lines of both diverter lines are connected to an inlet line for the other two circuits; and
the priority-demand valve means has an output port connected to the first circuit input line and includes a spring-loaded pressure sensitive valve means having a first pressure and spring actuated end communicating with a return line of the first circuit and a second pressure actuated end communicating with the first circuit input line, the pressure sensitive valve means being shiftable by a certain predetermined pressure differential between the first circuit input and return lines for opening communication between the input and output ports and furnishing the first circuit with the additional hydraulic fluid.

5. A hydraulic power system according to claim 4, wherein a pressure regulating valve is in the return line upstream of the first pressure and spring actuated end of the priority-demand valve means, and a one-way flow valve is in the return line arranged in parallel with the pressure regulating valve.

6. A hydraulic power system with automatic priority-demand flow control means, comprising:
first, second, and third hydraulic power circuits wherein as least the first circuit has priority over the other two circuits;
a single fluid source means for supplying hydraulic fluid to the three circuits; and
a flow control valve means in the first circuit for receiving the flow of hydraulic fluid from the source means and apportioning it between three circuits, the control valve means including a priority-demand flow control valve means for diverting a portion of the apportioned flow to the second and the third circuits and combining the portion with the apportioned flow to the first circuit upon demand of additional hydraulic fluid by the first circuit, the flow control valve means comprising a two-position valve means having an input port communicating with the source means and two output ports, one of the output ports is arranged to communicate with an inlet line for the second and third circuits in both positions of the valve means and the other output port is arranged to communicate with an input line of the first circuit in only one position of the two-position valve means, the two-position valve means having a first pressure and spring actuated end communicating with a first control line having a throttle therein and connected to the fluid source upstream of the throttle and having a second pressure actuated end communicating with a second control line connected to the fluid source, the two-position valve means being moveable to either position by a certain predetermined pressure differential between the first and second control lines, and the priority-demand valve means has an output port connected to the first circuit input line and includes a first pressure and spring actuated end communicating with a return line of the first circuit and a second pressure actuated end communicating with a third control line connected to the input line of the first circuit, the priority-demand valve means being shiftable by a certain predetermined pressure differential between the first circuit input and return lines for closing communication between the input and output ports of the priority-demand valve means.

7. A hydraulic power system according to Claim 6, where in a pressure regulating valve is in the return line upstream of the first pressure and spring actuated end of the priority-demand valve means, and a one-way flow valve is in the return line arranged in parallel with the pressure regulating valve.

* * * * *